UNITED STATES PATENT OFFICE 2,274,297

METHOD OF TREATING EARTH AND ROCK FORMATIONS

Carroll Irons and Sylvia M. Stoesser, Midland, Mich., assignors to The Dow Chemical Company, Midland, Mich., a corporation of Michigan No Drawing. Application December 16, 1938, Serial No. 246,082

26 Claims. (Cl. 166—22)

This invention relates to subterranean sealing operations. It more especially concerns sealing and consolidating operations in earth and rock formations penetrated by a well bore, particularly those drilled for oil and gas, although it may be used in other types of wells, such as water and brine wells.

The principal object of the invention is to provide a method of converting porous, fissured, cracked, cavernous, and fluid permeable formations into a fluid-impermeable mass possessing high mechanical strength and unaffected by water, oil, or gas.

A further object is to provide a method of treating formations penetrated by a well bore to render certain portions of a stratum encountered impervous to fluid flow.

A particular object is to provide a method of making a seal in a subterranean boring.

Another object is to provide a method of treating a well bore and the formation adjacent thereto to produce therein a consolidating solid deposit or sheath to prevent caving, sloughing, or shifting of the earth or rock.

Other objects and advantages will be apparent as the description of the invention proceeds.

According to our invention there is introduced into the formation in which the sealing operation is to be effected a resin-forming liquid, as by introducing the liquid into a well drilled thereinto, such liquid being of the type which by polymerization, addition, condensation, or like chemical reaction is transformed into a solid or semisolid synthetic resin insoluble in either oil or water, whereby there is produced the desired subterranean seal. Subterranean earth and rock formations sealed with such a liquid after transformation into a solid resin are strengthened and rendered substantially impervious to fluids. Many resin-forming liquids are available which are mobile at ordinary temperatures and are of such nature that of themselves, or when mixed with a suitable catalyst, spontaneously undergo polymerization, condensation, or an addition reaction until the whole liquid becomes an insoluble mechanically strong solid resin. We have found that by depositing or injecting such a liquid into fluid permeable earth or rock, and particularly by forcing the liquid into the formation surrounding a well bore, a water- and oil-insoluble resin deposit is formed which not only consolidates and strengthens the formation, but also renders it substantially impervious to the flow of fluids.

The foregoing sealing method particularly as applied to treating earth or rock formations to bring about consolidation, reinforcing, reduction of fluid permeability, and the like, has the advantage of great simplicity as well as effectiveness. For example, a mobile resin-forming liquid can be injected readily into porous formations which will not admit the usual cementing agents, such as aqueous cement suspensions and liquids forming insoluble precipitates with water or brine naturally present in the formation or introduced thereinto for the purpose. The method also has the advantage that the solid resin, which is formed in situ wherever the resin-forming liquid is placed or injected, occupies substantially the same volume as that of the liquid from which it is produced. Hence the consolidating, sealing, and pore plugging effect produced is far superior to that attainable with the conventional methods.

In carrying the invention into effect a resin-forming liquid of the type described is introduced into the earth or rock and held in place, if necessary, by the application of pressure until the transformation into a solid resin has occurred. Various resin-forming liquids suitable for this purpose are known, the following being specific examples of those which are suitable for use in accordance with the invention.

Example 1

Mix together 60 parts of styrene (unpolymerized), 30 parts of oil pitch, and 10 parts of petroleum oil, and then add a suitable catalyst in amount such that transformation of the liquid mixture into a solid resinous body will occur after a predetermined time. Stannic chloride may be used for this purpose, the amount employed being selected so as to bring about the desired polymerization at a convenient rate. The addition of about 2½ per cent by volume of stannic chloride, based upon the volume of styrene, makes a liquid mixture which is quite fluid and remains so for about 90 minutes at ordinary temperatures. The mixture becomes a very strong solid resin insoluble in oil or water within 10 hours.

Example 2

Unpolymerized styrene may be used undiluted and without a catalyst when injected into formations having a temperature of about 150° F. or more, since heat alone brings about polymerization at a rate which depends upon the temperature of the formation. At about 70° F. styrene will remain sufficiently liquid for a relatively long time so as to be pumped through fine pores, but becomes a solid hard resin at a temperature above about 150° F. within 7 days.

Example 3

Unpolymerized styrene mixed with about 2 per cent of stannic chloride by volume remains sufficiently liquid for about 20 minutes to be injected into porous earth or rock and therein becomes a solid resin in about 2½ hours, when the earth temperature is about 100° F., and at ordinary temperature becomes solid within 8 to 12 hours.

Example 4

Vinylidene chloride is mixed with a suitable catalyst, such as a mixture of 0.7 per cent of tetraethyl lead, 0.6 per cent of chlor-acetyl chloride, and 0.25 per cent of benzoyl peroxide. The resulting mixture remains fluid for about 50 minutes at 100° F. and longer at ordinary temperatures, but gradually changes so that it cannot be injected into fine pores thereafter. It may be injected into porous earth or rock within about 50 minutes of the time it is made up and therein becomes a solid resin insoluble in oil or water within about 24 hours.

Example 5

Styrene is mixed with petroleum oil in amount up to 30 per cent by volume, and about 2 per cent of stannic chloride based upon the volume of styrene is added. The function of the petroleum oil is to act as a diluent reducing the speed of polymerization. With no added oil the mixture of styrene and catalyst alone becomes a solid resin in about 2½ hours at 100° F. When from 10 to 20 per cent by volume of oil is present, the mixture becomes solid within 18 hours at 100° F. and with 30 per cent of oil the mixture becomes a semi-hard solid in about 18 hours and becomes quite solid in 30 hours.

Example 6

A phenol-formaldehyde resin-forming liquid may be prepared in the following manner. Mix 40 parts by weight of phenol with 50 parts by weight of an aqueous solution of formaldehyde containing 37 per cent by volume of formaldehyde and add thereto 1.35 parts by weight of sodium hydroxide. The resulting solution is then heated for 6 hours at a temperature of between 75° to 80° C. and becomes a clear amber liquid. This clear liquid is then mixed with 15 per cent by volume of a catalyst consisting of 40 per cent by volume of 95 per cent ethyl alcohol and 60 per cent by volume of concentrated (36 per cent by volume) hydrochloric acid. The mixture so formed remains a pumpable fluid for about 40 minutes but gradually changes so that it becomes a solid resin insoluble in oil or water within about 12 hours.

The foregoing examples are merely illustrative of several resin-forming liquids which may be introduced into porous earth or rock according to our invention to produce therein a solid oil- or water-insoluble cementitious deposit. Other resin-forming liquids are known, such as certain of the liquid vinyl esters, such as vinyl chloride, vinyl acetate or mixtures thereof. These may be employed similarly according to the invention.

Although it is generally preferable to mix the catalyst bringing about the polymerization of the resin-forming liquid with said liquid prior to its introduction into the well in the manner described in the examples, in some instances it may be desirable to mix the catalyst with the resin-forming liquid within the well bore, preferably at the location at which the seal is to be made. For example, in those instances where rapid polymerization occurs upon the addition of the catalyst to the resin-forming liquid, it is generally desirable to introduce the catalyst and the resin-forming liquid into the well through separate pipes and bring about their mixing in the well, as by passing them simultaneously through a suitable mixing head attached to the pipes used for their introduction, in order to guard against solidification of the resin-forming liquid prior to its placement at the desired location.

In some instances, as when attempting to seal off fissured or cavernous formations or when forming a plug in the bore hole, it is oftentimes desirable to employ a resin-forming liquid mixture which is relatively resistant to flow, so that the resin-forming liquid will not rapidly drain away before solidifying and thus prevent an effective seal being formed. Resin-forming liquid mixtures of a viscous nature and having the desired resistance to flow may be prepared by adding an inert filler capable of preventing the resin-forming liquid from draining rapidly away. Examples of such fillers are shredded or powdered asbestos, hemp, sawdust, wood fiber or the like. A generally suitable amount of such filler to add is from about 10 to 30 per cent by volume, depending upon the resistance to flow desired. Resin-forming liquids of a viscous nature and having a high resistance to flow may also be prepared by partially polymerizing the resin-forming liquid before use. By controlling the conditions, as for example, the amount of catalyst added or the temperature at which polymerization takes place, a resin-forming liquid of a viscous nature and having the desired resistance to flow may be readily obtained.

In the treatment of an earth formation according to our invention, the resin-forming liquid is introduced into the earth or rock to be treated, where it permeates the formation, and is allowed to remain undisturbed until it has set to a solid mass, sealing the pores and binding the formation into a consolidated mass.

The treatment of the formation surrounding a well bore, or the well bore itself, may be accomplished by introducing the resin-forming liquid into the bore and allowing it to reach the location at which it is desired to form the solid resin deposit. By properly locating the resin-forming liquid any portion of the bore of a well may be treated therewith or any portion of the formation which is accessible from the well bore. For example, the lower portion of a well bore may be sealed or plugged by introducing thereinto a suitable quantity of a resin-forming liquid containing an appropriate catalyst, if necessary. After polymerization, condensation, or like transformation has occurred, the liquid becomes a solid mass completely plugging the bottom of the bore. If it is desired to treat the earth or rock for a considerable distance beyond the well bore itself, fluid pressure may be applied to the resin-forming liquid after introducing it into the bore, so as to force the liquid into the formation, where it is allowed to remain under pressure, if necessary, to prevent its return to the well bore until it has set to a solid mass. In some instances heat may be applied to the earth or rock containing the resin-forming liquid to aid or bring about its transformation into a solid resin when the rate of transformation at ordinary temperatures is insufficient. Such heating may be effected in any convenient manner, as by applying an electric heater to the formation.

In addition to being particularly suited to sealing off the formation surrounding the well bore and to forming a plug in the well bore in the manner above described, the resin-forming liquids may also be suitably used in connection with other sealing operations in a well bore. For example, it is oftentimes desirable to increase the effectiveness of the seal obtained when employing a formation packer of conventional type. By impregnating the formation immediately surrounding a packer and allowing some of the resin-forming liquid to solidify around the packer, a highly effective seal is produced. In a similar manner the resin-forming liquids may be used to increase the effectiveness of the seal produced by a cement plug or the like placed in the bottom hole or to protect and seal a cemented casing seat against attack by acid during a conventional acid treatment. Sealing may also be effected behind the conventional metal casing, ordinarily employed to prevent the walls of the well bore from caving. By introducing the resin-forming liquid into the annular space behind the metal casing and allowing it to solidify therein, a highly effective seal is produced which holds the casing in place and prevents the infiltration of fluids into the well bore. Likewise leaks in the metal casing or leaks in the casing joints may be similarly sealed.

The injection of a resin-forming liquid into water-bearing strata of wells yielding oil or gas is particularly useful for shutting off water or brine infiltration and may be accomplished readily. If the water- or brine-bearing stratum lies below an oil-bearing stratum, its treatment may be accomplished by first forcing the water or brine standing in the well back into the formation or otherwise removing it from the well bore, and then introducing into the bore a resin-forming liquid, and applying sufficient pressure to force it into the formation, the pressure being maintained upon the injected liquid until it has set into a solid resin. In a treatment of this kind a resin-forming liquid is chosen which is capable of setting to a solid resin in the presence of water or brine, such as vinylidene chloride. If desired, the resin-forming liquid may be so positioned in the bore of the well so as to enter a formation at any desired level by first introducing into the well bore a suitable supporting means, such as an organic jellifying material, as described in U. S. Patent No. 1,998,756, and then introducing the resin-forming liquid. Pressure is then applied to the resin-forming liquid so as to inject it into the formation, the pressure being maintained for a sufficient time to permit the resin to set in situ. The organic jellified material employed becomes liquid in time and may be pumped or bailed from the well to permit the well to produce. A similar procedure may be employed to treat dry earth or rock formations or those yielding gas by injecting into such formations a resin-forming liquid in any convenient manner known to the art.

This application is a continuation-in-part of our co-pending application Serial No. 114,646, filed December 7, 1936.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method of treating an earth or rock formation, the step which consists in introducing into the formation a resin-forming liquid capable of transformation into a solid resin.

2. In a method of treating an earth or rock formation, the step which consists in introducing into the formation a resin-forming liquid capable of transformation into a solid resin by the application of heat.

3. In a method of treating an earth or rock formation, the steps which consist in introducing into the formation a resin-forming liquid capable of being transformed into a solid resin by the application of heat, and heating the earth formation.

4. In a method of treating an earth or rock formation penetrated by a well bore, the step which consists in introducing into the bore a resin-forming liquid and a catalyst capable of bringing about the transformation of the liquid into a solid resin.

5. A method of treating an earth or rock formation penetrated by a well bore, which comprises introducing into the bore a resin-forming liquid, a diluent, and a catalyst capable of transforming the liquid into a solid resin.

6. In a method of treating an earth or rock formation penetrated by a well bore, the steps which consist in introducing into the bore and thence into the formation a resin-forming liquid capable of being transformed into a solid resin.

7. In a method of treating an earth or rock formation penetrated by a well bore, the steps which consist in introducing into the bore and thence into the formation a mixture of a resin-forming liquid and a catalyst capable of transforming the liquid into a solid resin.

8. A method of treating an earth or rock formation penetrated by a well bore, which comprises introducing into the bore and thence into the formation a resin-forming liquid, a diluent therefore, and a catalyst capable of transforming the liquid into a solid resin.

9. In a method of treating an earth or rock formation penetrated by a well bore, the step which consists in introducing into the bore and thence into the formation an oil-soluble but water-insoluble resin-forming liquid.

10. In a method of treating an earth or rock formation penetrated by a well bore, the steps which consist in introducing into the bore a resin-forming liquid capable of being transformed into a solid resin, applying pressure to the liquid so as to force it into the formation and maintaining pressure upon the liquid until it has set to a solid resin.

11. In a method of treating an earth or rock formation penetrated by a well bore, the steps which consist in introducing into the bore a mixture of a resin-forming liquid and a catalyst capable of transforming the liquid into a solid resin, applying pressure to the liquid so as to force it into the formation, and maintaining pressure upon the liquid until it has set to a solid resin.

12. In a method of treating an earth or rock formation penetrated by a well bore, the steps which consist in introducing into the bore a mixture of a resin-forming liquid, a diluent, and a catalyst capable of transforming the liquid into a solid resin, applying pressure to the liquid so as to force in into the formation, and maintaining pressure upon the liquid until it has set to a solid resin.

13. In a method of treating an earth or rock formation penetrated by a well bore, the steps which consist in introducing into the bore a liquid vinyl ester capable of being transformed into a solid resin, applying pressure to the liquid so as to force it into the formation, and maintaining pressure upon the liquid until it has set to a solid resin.

14. In a method of treating an earth or rock formation penetrated by a well bore, the steps which consist in introducing into the bore liquid vinylidene chloride and a catalyst capable of effecting the transformation of the liquid into a solid resin, applying pressure to the liquid so as to force it into the formation, and maintaining pressure upon the liquid until it has set to a solid resin.

15. In a method of treating an earth or rock formation penetrated by a well bore, the steps which consist in introducing into the bore liquid styrene, applying pressure to the liquid so as to force it into the formation, and maintaining pressure upon the liquid until it has set to a solid resin.

16. In a method of treating an earth or rock formation penetrated by a well bore, the steps which consist in introducing into the bore liquid styrene and a catalyst capable of effecting the transformation of the liquid into a solid resin, applying pressure to the liquid so as to force it into the formation, and maintaining pressure upon the liquid until it has set to a solid resin.

17. In a method of forming a solid deposit in an earth or rock formation having a temperature sufficient to effect solidification of a resin-forming liquid transformable by heat into a solid resin, the step which consists in impregnating the formation with such resin-forming liquid.

18. In a method of forming a solid consolidating deposit in a fluid permeable earth or rock formation, the steps which consist in impregnating the formation with a resin-forming liquid transformable by heat into a solid resin, and heating the impregnated formation to effect solidification of the liquid.

19. In a method of forming a consolidating deposit in a fluid permeable earth or rock formation, the step which consists in impregnating the formation with a resin-forming liquid comprising uncondensed phenol formaldehyde mixture capable of being condensed to a substantially solid resin.

20. In a method of treating a well with a resin-forming liquid capable of transformation into a solid resin in the presence of catalyst, the step which consists in bringing about the mixing of the catalyst and the resin-forming liquid in the well bore.

21. In a method of treating a well with a resin-forming liquid, the step which consists in introducing into the well a partially polymerized resin-forming liquid.

22. The method of shutting off fluids in oil wells including introducing through the bore hole of a well into a permeable stratum of the well formation a thermo-setting resin-forming mixture having sufficient fluidity at ordinary temperatures to be forced into the permeable stratum and capable of setting and hardening in the stratum when subjected to heat existing in said stratum.

23. The method of shutting off fluids in oil wells including introducing through the bore hole of a well into a permeable stratum of the well formation a phenol-formaldehyde resin having sufficient fluidity at ordinary temperatures to be forced into the stratum and capable of setting and hardening in the stratum when subjected to the heat existing in said stratum.

24. The method of selectively plugging off water from producing strata of a well consisting of adding an acid accelerator to an uncondensed thermo-setting phenol-formaldehyde mixture, introducing the mixture into water-bearing portions of the producing strata through the bore hole of the well prior to setting of the mixture, and retaining the same in said portions of the strata until it sets therein.

25. The method of shutting off fluids from an oil well including introducing through the bore hole of the well into a permeable stratum opening to the well an uncondensed thermo-setting resin-forming mixture and an acid accelerator capable of controlling the setting time of the mixture at the stratum temperature, and forcing the mixture from the bore-hole into the stratum.

26. A method of plugging formations in wells comprising introducing a resin forming liquid into the formation and controlling the time of set of the liquid by the addition of a catalyst to the liquid.

CARROLL IRONS.
SYLVIA M. STOESSER.